May 17, 1966      J. M. DENNEY      3,251,995
AEROSPACE VEHICLE HAVING A SELF-CONTAINED TELEMETRY SYSTEM
Filed March 15, 1961      2 Sheets-Sheet 1
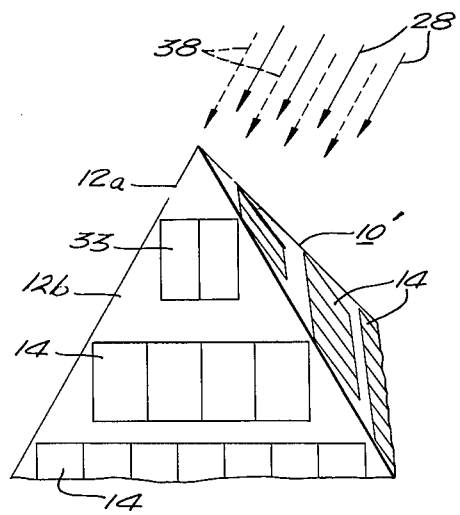
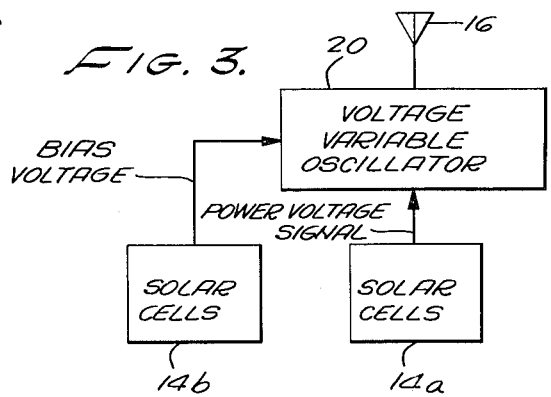
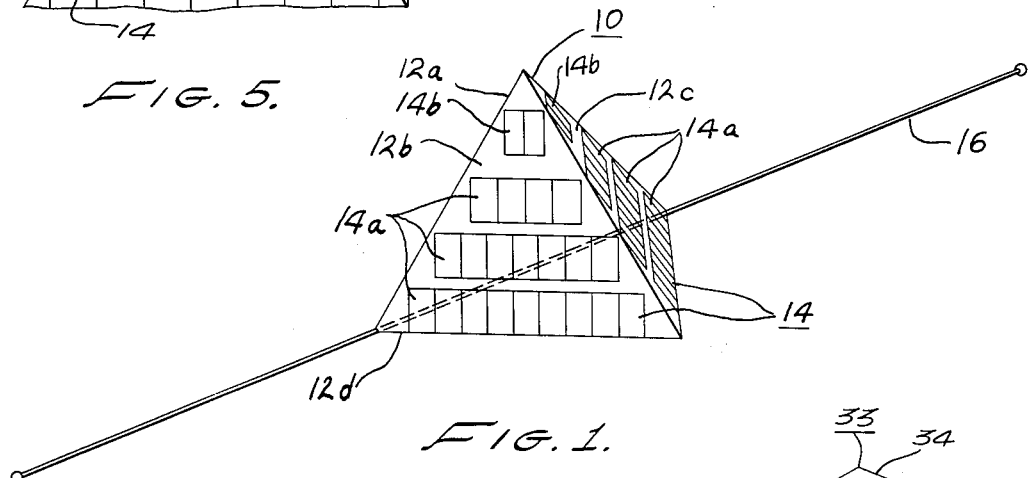
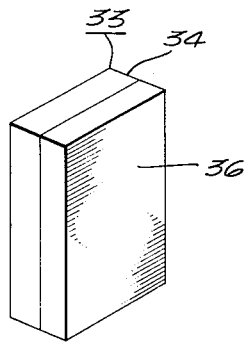
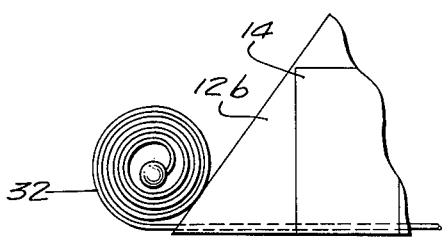
INVENTOR.
JOSEPH M. DENNEY
BY Don Finkelstein
Albert Rosen
AGENT
ATTORNEY

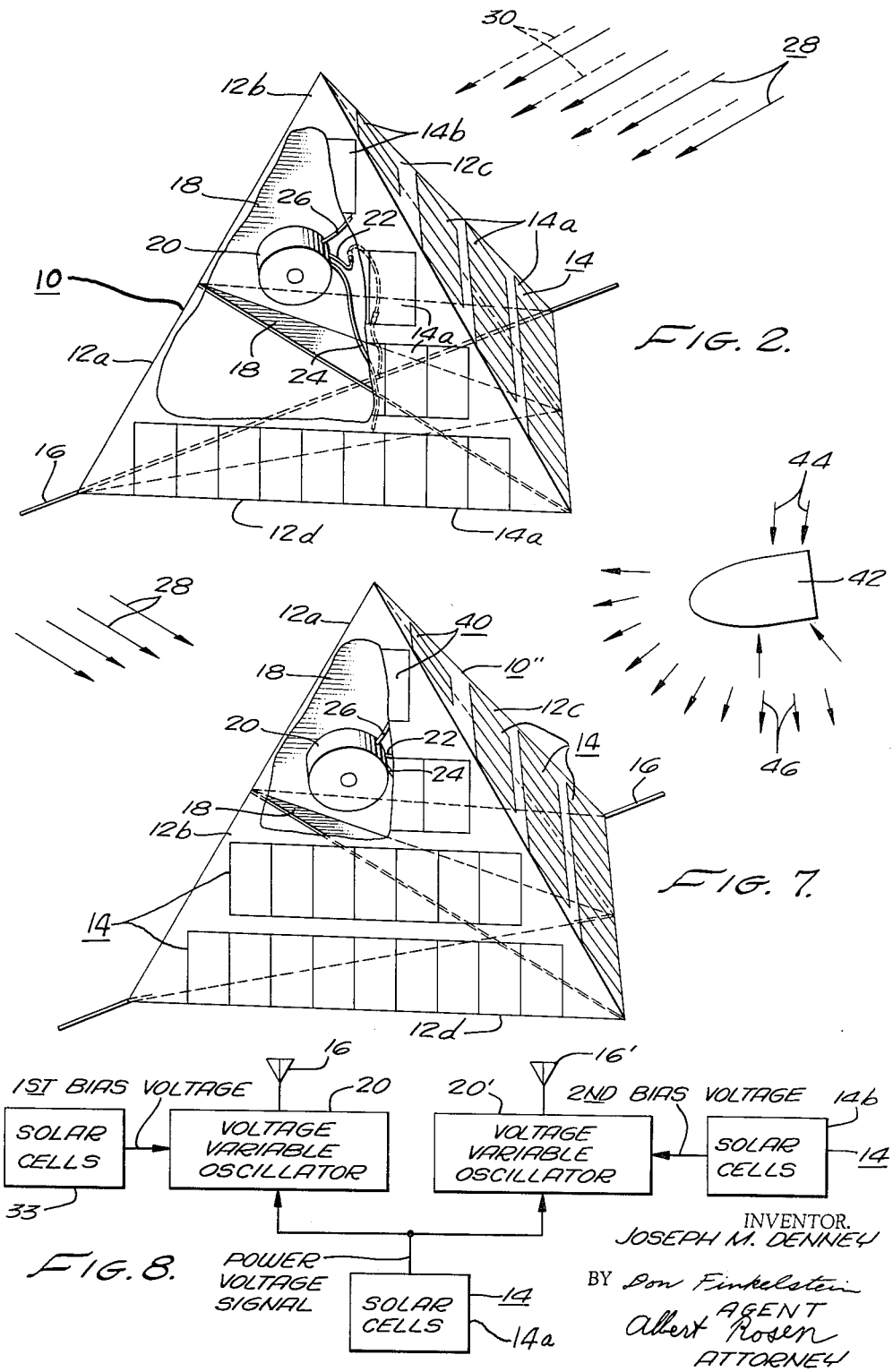

United States Patent Office 3,251,995
Patented May 17, 1966

3,251,995
AEROSPACE VEHICLE HAVING A SELF-CONTAINED TELEMETRY SYSTEM
Joseph M. Denney, Los Angeles, Calif., assignor, by mesne assignments, to TRW Inc., a corporation of Ohio
Filed Mar. 15, 1961, Ser. No. 95,849
12 Claims. (Cl. 250—83.3)

This invention relates generally to the space vehicle art and, more particularly, to an improved space vehicle for providing a highly reliable and low cost structure useful in orbiting and deep probe applications.

It has recently been recognized that environmental conditions in certain regions of space may have deleterious effects on both organic and inorganic materials. In particular, for example, it is estimated that radiation concentration in the inner Van Allen belt may cause severe damage to semiconductors, such as solar cells, with consequent degradation of performance.

Satellites, space probes, and other space vehicles utilized in the past have not always proven satisfactory for utilization in all regions of space because, among other factors, they have been characterized by high cost, high degree of complexity and high weight as well as exhibiting decreased performance due to environmental conditions. These characteristics have limited their utility in operation under all environmental space conditions.

Accordingly, it is an object of this invention to provide an improved space vehicle.

It is another object of this invention to provide an inexpensive, light weight space vehicle having a simple self-contained telemetry system.

It is yet another object of this invention to provide a space vehicle configuration that permits a plurality of such space vehicles to be placed in space from one launching vehicle.

The foregoing and other objects are realized, in accordance with the principles of this invention, by providing a comparatively small body member coupled to at least one telemetry antenna. The exterior surfaces of the body member define a regular geometric body, such as an equilateral tetrahedron, and interior surfaces of the body member define a cavity. The telemetry equipment is contained within the cavity and comprises a voltage variable oscillator, adapted to generate an information signal in a predetermined frequency bandwidth, and is directly connected to the antenna. A plurality of electromagnetic radiation responsive means, such as solar cells, is disposed on the exterior surfaces of the body member in a predetermined pattern. A first portion of the solar cells is series connected and generates a power voltage signal in response to the intensity of, for example, sunlight in the visual portion of the electromagnetic radiation spectrum. The power voltage signal is applied to the voltage variable oscillator to supply the energy required for its operation.

A second portion of the solar cells is also series connected and generates a bias voltage signal in response to the intensity of the sunlight. The bias voltage signal is applied to the voltage variable oscillator and varies the frequency of the information signal, within the predetermined frequency bandwidth, in response to the magnitude of the bias voltage signal. The effects of space environmental conditions, such as the radiation in the inner Van Allen belt, may cause a degradation in the performance of solar cells. Therefore, exposure of the space vehicle to these environmental conditions may induce a change in the magnitude of the bias voltage signal which in turn varies the frequency of the information signal. Measurement of the changes in the information signal frequency provides an indication of the extent of performance degradation in the solar cells caused by the environmental conditions.

In another embodiment of this invention, changes in spectral intensity of a preselected bandwidth of electromagnetic radiation may be measured. For example, it may be desired to measure intensity variations in the near infrared region of the electromagnetic radiation spectrum. The same basic configuration as above described may be utilized except that the bias voltage signal is generated by electromagnetic radiation responsive means sensitive to the near infrared wavelengths. Such electromagnetic radiation responsive means may comprise a germanium coated lead sulphide cell for measurement of the infrared bandwidth between 1.0 and 2.8 microns.

The above and other embodiments of this invention are more fully disclosed in the following detailed description with reference to the accompanying drawing wherein similar reference characters refer to similar elements and in which:

FIGURE 1 illustrates a vehicular arrangement according to applicant's invention;

FIGURE 2 is a partial sectional view of the arrangement shown on FIGURE 1;

FIGURE 3 is a block diagram of the electrical system of the arrangement shown on FIGURE 1;

FIGURE 4 illustrates another vehicular arrangement according to applicant's invention;

FIGURE 5 illustrates another embodiment of applicant's invention;

FIGURE 6 illustrates electromagnetic radiation detector means, useful in practicing applicant's invention;

FIGURE 7 illustrates another embodiment of applicant's invention; and

FIGURE 8 is a block diagram illustrating another embodiment of applicant's invention.

Referring now to FIGURE 1, there is shown a space vehicle 10 in accordance with the principles of this invention. The space vehicle 10 has walls 12a, 12b, 12c, and 12d, the external surfaces of which define an equilateral tetrahedron. The internal surfaces of the walls 12a, 12b, 12c, and 12d define a cavity. A plurality of solar cells, generally designated 14, are disposed at a preselected array and are coupled to the exterior surfaces of the walls 12a, 12b, 12c, and 12d and a telemetry antenna 16 is connected to an edge of the tetrahedron. A first portion 14a of the solar cells 14 is connected in series to provide a power voltage signal. A second portion 14b of the solar cells 14 is also connected in series to provide a bias voltage signal. The solar cells 14 may, for example, be silicon solar cells. Such cells are responsive to electromagnetic radiation having energy in the visible portion of the electromagnetic radiation spectrum, such as is contained in the energy received from sunlight. The solar cells 14 generate a voltage signal having a magnitude proportional to the intensity of energy in the visible portion of the electromagnetic radiation spectrum.

Referring now to FIGURE 2, there is shown a partially cutaway view of the space vehicle 10 of FIGURE 1 illustrating the structure in the cavity formed by the interior portions of walls 12a, 12b, 12c, and 12d. A support member 18 is coupled to the interior surface of wall 12a. A voltage variable oscillator 20 is attached to the support 18. The oscillator 20 is adapted to generate an information signal in a predetermined frequency bandwidth and is connected by wire means 22 to the antenna 16. The antenna 16 in turn radiates the information signal. The oscillator 20 is powered by the power voltage signal generated by the series connected first portion 14a of the solar cells 14 and the power voltage signal is applied to the oscillator 20 by wire means 24. A bias voltage signal, generated by the series connected second portion 14b of the solar cells 14, is applied to the oscillator 20 by wire means 26. The frequency of the signal generated by the oscillator 20 is varied, within the preselected frequency bandwidth, in response to variations in the intensity of the bias voltage signal.

The space vehicle 10 may be launched into space from earth by a rocket booster. Upon separation of the space vehicle 10 from the rocket booster, the space vehicle 10 may be placed into an orbit around the earth wherein space vehicle 10 is subjected to radiation from the inner Van Allen belt as well as electromagnetic radiation from the sun. It will be appreciated that this utilization of the space vehicle 10 of this invention is illustrative only; the space vehicle 10 may also be utilized in deep space probes and other space missions not requiring an orbiting vehicle, and in applications where a plurality of space vehicles 10 are launched by a single booster. However, separation of the space vehicle 10 from the rocket booster will be substantially similar in all such applications.

In the above-described orbit, the space vehicle 10 is subjected to electromagnetic radiation 28 emitted from the sun which contains energy in the visible portion of the electromagnetic radiation spectrum. The solar cells 14 are responsive to this energy and generate a voltage having a magnitude proportional to the intensity of such radiation. In addition, the vehicle 10 is also exposed to radiation 30 existing in the inner Van Allen radiation belt. The radiation 30 may be deleterious to the solar cells 14 and result in a lowered efficiency. Upon receiving the radiation 30, first portion 14a of the solar cells 14 may exhibit a decrease in the magnitude in the power voltage signal, which provides lower power to the oscillator 20 and, hence, a lower intensity signal radiated from the antenna 16. The second portion 14b of the solar cells 14 also receives the radiation 30 and may exhibit a decrease in the magnitude of the bias voltage signal. Since the bias voltage signal is applied to the oscillator 20 by wire means 26, changes in the magnitude of the bias voltage signal change the frequency of the information signal. Thus, the changes in the magnitude of the bias voltage signal caused by the deleterious effect of the radiation 30 on the second portion 14b of the solar cells 14 is exhibited by a change in the frequency by the signal radiated of the antenna 16. A measurement of this change of the frequency thus provides an indication of the performance degradation to the solar cells 14 caused by the radiation 30. While the measurement of the decreased intensity of the signal radiated by antenna 16 caused by performance degradation of the first portion 14a of the solar cells 14 would also provide similar information, the many other competing mechanisms (e.g., atmospheric attenuations) prohibit accurate measurement of variations in signal intensity while not appreciably affecting accurate measurement of signal frequency.

FIGURE 3 shows a block diagram of the telemetry system incorporated in a space vehicle 10 of FIGURES 1 and 2. The power voltage signal generated by the first portion 14a of the solar cells 14 power the voltage variable oscillator 20, which generates an information signal that is fed to antenna 16. The second portion 14b of the solar cells 14 generates a bias voltage which is fed to the voltage variable oscillator 20 which varies the frequency of the information signal, within the predetermined frequency bandwidth, in response to magnitude variations of the bias voltage.

Applicant has found that his invention may be practiced on comparatively small space vehicles. Thus, for example, the equilateral tetrahedron of space vehicle 10 may measure four inches on an edge and have eighty-eight solar cells 14 coupled to the wall portions 12a, 12b, 12c, and 12d. If the nominal information signal frequency generated by the oscillator 20 is on the order of 108 megacycles, the antenna 16 would be approximately sixteen inches long. Higher frequency results in shorter antenna lengths. This configuration will weigh on the order of one-half pound. Because of its small size and low weight, a plurality of space vehicles 10 may be launched into space by a single rocket booster and, since each of the space vehicles 10 is independent of all other such space vehicles, failure or destruction of one or several of such space vehicles still permits a successful mission from the remaining space vehicles that operate satisfactorily. Further, the cost of each such space vehicle is comparatively low, thereby providing economic space operations.

A small size space vehicle as described above could also be easily incorporated into other space vehicle launchings. For example, if a large space vehicle were to be launched, one or more of space vehicles 10 could also be included in the payload structure without appreciably increasing the cost or complexity of the basic launching vehicle. Such configurations are often termed "piggyback" launchings. For such a launching, it may be desired to economize volume. FIGURE 4 shows an antenna structure that is useful in such applications. An antenna 32 may be fabricated in the form of a coil from a spring type material. During launch, the antenna 32 would be maintained in its coiled position and on separation from the launch vehicle it unwinds to provide the required antenna length.

In another embodiment of applicant's invention, an information signal may be generated containing intelligence relative to the spectral content of electromagnetic radiation to which the space vehicle is exposed. FIGURE 5 illustrates this configuration.

A space vehicle 10' is similar to the configuration of that shown for the space vehicle 10 of FIGURE 1. However, at least some of the wall portions, e.g., wall 12a and wall 12b, support a plurality of electromagnetic radiation reponsive means 33 which, for example, may be responsive to energy in the near infrared wavelengths. Thus, the electromagnetic radiation responsive means 33 may be constructed of a lead sulphide cell coated with a thin layer of germanium. This construction of the electromagnetic radiation responsive means 33 is shown in FIGURE 6. A lead sulphide cell 34 is coated with a thin (e.g., one millimeter) coating of germanium 36. Such a combination is responsive to electromagnetic radiation substantially between 1.0 and 2.8 microns.

The plurality of electromagnetic radiation responsive means 33 of FIGURE 5 is series connnected and, in response to electromagnetic radiation 38 having energy in a wavelength bandwidth between 1.0 and 2.8 microns, generates a bias voltage control signal having a magnitude proportional to the intensity of such radiation. This bias voltage signal controls the frequency of a voltage variable oscillator in a manner similar to that described in connection with the embodiment of FIGURE 1.

Power for such a voltage variable oscillator is obtained from a series connected plurality of solar cells 14 that are subjected to electromagnetic radiation 28 emitted from the sun.

This invention may also be utilized in another embodiment to detect the presence of foreign bodies in a given sector of space. It is known that, in space, bodies are subjected to bombardment by cosmic rays and, as a result of this bombardment, emit secondary electrons at a rate proportional to the mass of the body. The emission of these secondary electrons is isotropic from the body. Referring to FIGURE 7, there is shown an embodiment of this invention for detecting the presence of foreign bodies in a given sector of space. A space vehicle 10" may be launched into a preselected sector of space. The space vehicle 10" is similar in configuration to the space vehicle 10 of FIGURES 1 and 2. A plurality of solar cells 14 is coupled to the external surfaces of walls 12a, 12b, 12c, and 12d of the space vehicle 10". Solar cells 14, upon receiving electromagnetic radiation 28 emitted from the sun, generate a power voltage signal having a magnitude proportional to the intensity of the radiation 28. The power voltage signal is utilized to power a voltage variable oscillator 20, through wire means 24, contained within a cavity formed by the wall portions 12a, 12b, 12c, and 12d. The oscillator 20 generates an information signal in a predetermined frequency bandwidth and feeds the information signal to the antenna 16 through a wire means 22.

A foreign body 42, which may be an approaching ICBM warhead, is also in a region of space in proximity to the sector of space occupied by the space vehicle 10″. The foreign body 42 is subjected to primary cosmic rays 44 and, as these primary cosmic rays 44 traverse the foreign body 42, secondary electrons 46 are emitted therefrom. The rate of emission of these secondary electrons 46 is proportional to the mass of the body 42.

Secondary electron detecting means 40 are coupled to the walls 12a, 12b, 12c and 12d of the space vehicle 10″ and may be of conventional electron detector design. As the secondary electrons 46 strike the secondary detectors 40, a bias voltage is generated by the secondary electron detectors 40. The bias voltage thus generated has a magnitude proportional to the rate of bombardment by the secondary electrons 46. The bias voltage thus generated is fed to the voltage variable oscillator 20 by wire means 26.

As the secondary electron detectors 40 are bombarded by an increasing number of secondary electrons 46, the magnitude of the bias voltage signal is changed which in turn changes the frequency of the information signal generated by voltage variable oscillator 20 within the predetermined frequency bandwidth. Detection of these frequency changes in the information signal provides an indication of the presence of a foreign body in regions adjacent the space vehicle 10″.

Applicant has also found that several information signals may be generated from a single space vehicle in accordance with applicant's invention. Thus, for example, two telemetry antennae may be included in the space vehicle together with two voltage variable oscillators feeding their signals, respectively, into the two antennae. FIGURE 8 shows a block diagram of such an arrangement. A first portion 14a of a plurality of solar cells 14, which may be coupled to exterior surfaces of a space vehicle, are series connected to provide a power voltage signal which is fed into the voltage variable oscillators 20 and 20′. Each of the voltage variable oscillators generates an information signal in a predetermined frequency bandwidth and voltage variable oscillator 20 feeds its information signal to antenna 16 and voltage variable oscillator 20′ feeds its information signal to antenna means 16′. A plurality of electromagnetic radiation responsive means 33, which, for example, may be responsive to electromagnetic radiation in the near infrared wavelengths such as those described in connection with FIGURE 5, generates a first bias voltage signal having a magnitude proportional to the intensity of the near infrared wavelengths and this first bias voltage signal is applied to voltage variable oscillator 20. A second portion 14b of a plurality of solar cells 14, which, for example, may be silicon solar cells, generates a second bias voltage signal having a magnitude proportional to the intensity of electromagnetic radiation in the visible portions of the electromagnetic radiation spectrum and this second bias signal is fed to voltage variable oscillator 20′. Variations in the intensity of energy in either the near infrared wavelengths or the visible wavelengths result in variations in frequency of the signals radiated by antennae 16 and 16′, respectively. Detection of these variations in frequency provides an indication of the electromagnetic radiation environment to which a space vehicle is subjected.

Utilization of two antenna means, such as that described in connection with FIGURE 8, also provides a measure of dynamic control of the space vehicle during space flight. For a space vehicle of the general configuration as shown in FIGURE 1, the two antennae may be coupled along edges of the tetrahedron that are mutually perpendicular. For such a configuration, the space vehicle will not randomly tumble but will tend to rotate about an axis mutually perpendicular to both of the antennae and, therefore, allow a preferred orientation of such a space vehicle with respect to the sun, earth, or other body.

Those skilled in the art will find many variations and adaptations of applicant's invention. Therefore, the foregoing description of the various embodiments of applicant's invention together with the accompanying drawing are intended to be illustrative and not limiting and the appended claims are intended to cover all variations and adaptations within the true scope and spirit of this invention.

What is claimed as new and is desired to be secured by Letters Patent of the United States is:

1. In combination: a body member having a plurality of wall portions, each of said wall portions having interior surfaces and exterior surfaces, said interior surfaces defining a cavity and said exterior surfaces substantially defining an equilateral tetrahedron; a plurality of spaced solar cells disposed in a preselected pattern and coupled to said exterior surfaces for receiving electromagnetic radiation and adapted to generate a voltage in response thereto; a telemetry antenna coupled to said body member along an edge of said equilateral tetrahedron; a voltage variable oscillator positioned within said cavity and connected to said telemetry antenna for generating an information signal in a preselected frequency bandwidth and adapted to feed said information signal into said antenna; a first portion of said plurality of solar cells connected in series and connected to said voltage variable oscillator for powering said voltage variable oscillator; and a second portion of said plurality of solar cells connected in series and connected to said voltage variable oscillator for generating a bias voltage to vary the frequency of said information signal in response to the magnitude of said bias voltage.

2. In combination: a body member having a plurality of wall portions, each of said wall portions having an interior and an exterior surface, said interior surfaces defining a cavity and said exterior surfaces defining an equilateral tetrahedron; a plurality of solar cells disposed in a preselected array coupled to said exterior surfaces of said wall portions for receiving electromagnetic radiation having energy in a first preselected bandwidth and generating a power voltage signal having a magnitude proportional to the intensity of said first preselected bandwidth; at least one support member coupled to an interior surface of one of said wall portions and projecting inwardly into said cavity; at least one telemetry antenna coupled to said wall portions along an edge of said equilateral tetrahedron; oscillatory means carried by said support member for receiving said power voltage signal and generating an information signal in a predetermined frequency bandwidth; means connecting said oscillatory means to said telemetry antenna; a plurality of electromagnetic radiation responsive means disposed in a preselected array coupled to said exterior surfaces of said wall portions for receiving eletromagnetic radiation having energy in a second preselceted bandwidth different than said first preselected bandwidth and generating a bias voltage signal having a magnitude proportional to the intensity of said second preselected bandwidth; and means for applying said bias voltage signal to said oscillatory means whereby changes in the magnitude of said bias voltage signal changes the frequency of said information signal.

3. The arrangement defined in claim 2, wherein said first preselected bandwidth is in the visible portion of the electromagnetic radiation spectrum and said second preselected bandwidth is in the infrared portion of the electromagnetic radiation spectrum.

4. The arrangement defined in claim 3, wherein said plurality of electromagnetic radiation responsive means comprises a plurality of germanium coated lead sulphide cells.

5. In combination: a body member having a plurality of wall portions, each of said wall portions having an interior and an exterior surface, said interior surfaces defining a cavity and said exterior surfaces defining an equilateral tetrahedron; a plurality of solar cells disposed in a preselected array coupled to said exterior surfaces of said wall portions for receiving electromagnetic radiation having energy in a first preselected bandwidth and generating a power voltage signal having a magnitude proportional to the intensity of said first preselected bandwidth; at least one support member coupled to an interior surface of one of said wall portions and projecting inwardly into said cavity; at least one telemetry antenna coupled to said wall portions along an edge of said equilateral tetrahedron; oscillatory means coupled to said support member and positioned within said cavity for receiving said power voltage signal and generating an information signal in a predetermined frequency bandwidth; means connecting said oscillatory means to said telemetry antenna; a plurality of secondary electron responsive means disposed in a preselected array coupled to said exterior surfaces of said wall portions for receiving secondary electrons and generating a bias voltage signal having a magnitude proportional to the number of said secondary electrons received; and means for applying said bias voltage signal to said oscillatory means whereby changes in the magnitude of said bias voltage signal changes the frequency of said information signal.

6. In combination: a body member having a plurality of wall portions, each of said wall portions having an interior and an exterior surface, said interior surfaces defining a cavity and said exterior surfaces defining an equilateral tetrahedron; a plurality of solar cells disposed in a preselected array coupled to said exterior surfaces of said wall portions for receiving electromagnetic radiation having energy in a first preselected bandwidth and generating a power voltage signal having a magnitude proportional to the intensity of said first preselected bandwidth; a support member coupled to an interior surface of one of said wall portions and projecting inwardly into said cavity; a first telemetry antenna coupled to said wall portions along a first edge of said equilateral tetrahedron; a second telemetry antenna coupled to said wall portions along a second edge perpendicular to said first edge of said equilateral tetrahedron; first and a second voltage variable oscillators coupled to said support member and positioned within said cavity for receiving said power voltage signals and generating a first and a second information signal, respectively, in a predetermined frequency bandwidth; means for applying said power voltage signal to said first and said second voltage variable oscillators; means connecting said first voltage variable oscillator to said first telemetry antenna; means connecting said second voltage variable oscillator to said second telemetry antenna; a first plurality of electromagnetic radiation responsive means disposed in a preselected array coupled to said exterior surfaces of said wall portions for receiving electromagnetic radiation having energy in a second preselected bandwidth different than said first preselected bandwidth and generating a first bias voltage signal having a magnitude proportional to the intensity of said second preselected bandwidth; a second plurality of electromagnetic radiation responsive means disposed in a preselected array coupled to said exterior surfaces of said wall portions for receiving electromagnetic radiation having energy in a third preselected bandwidth different than said first and said second preselected bandwidths and generating a second bias voltage signal having a magnitude proportional to the intensity of said third preselected bandwidth; and means for applying said first bias voltage signal to said first voltage variable oscillator and means for applying said second bias voltage signal to said second voltage variable oscillator whereby changes in the magnitude of said bias voltage signals changes the frequency of said information signals.

7. The arrangement defined in claim 6, wherein said second preselected bandwidth is in the infrared portion of the electromagnetic radiation spectrum.

8. The arrangement defined in claim 7, wherein said first plurality of electromagnetic radiation responsive means comprises a plurality of germanium coated lead sulphide cells.

9. The arrangement defined in claim 6, wherein said second plurality of electromagnetic radiation responsive means comprises secondary electron detection means.

10. In combination:
a body member having a plurality of wall portions, each of said wall portions having interior surfaces and exterior surfaces, said interior surfaces defining a cavity and said exterior surfaces substantially defining an equilateral tetrahedron;
a plurality of spaced solar cells disposed in a preselected pattern on at least one of said exterior surfaces for receiving electromagnetic radiation and adapted to generate voltages in response thereto;
a voltage variable oscillator positioned within said cavity for generating an information signal in a preselected frequency bandwidth;
a first portion of said plurality of solar cells being connected to said voltage variable oscillator for powering the same; and
a second portion of said plurality of solar cells being connected to said voltage variable oscillator for applying a bias voltage to vary the frequency of said information signal.

11. In an aerospace vehicle having a plurality of external surfaces:
An array of solar cells supported on at least one of said surfaces for receiving solar radiation and generating voltages in response thereto;
oscillatory means for generating and radiating radio waves;
means for applying the voltages generated by a first plurality of said solar cells to energize said oscillatory means; and
control means responsive to the voltages generated by a second plurality of said solar cells for controlling the frequency of said oscillatory means.

12. An aerospace vehicle comprising:
(A) a body member having a plurality of flat outer surfaces forming a regular tetrahedron;
(B) means positioned on each of said surfaces for generating electrical energy in response to electromagnetic radiant energy,
(C) telemetering means coupled to said generating means for utilizing said electrical energy,
said telemetering means including a telemetry antenna coupled to said body member, a voltage variable oscillator coupled to said body member for transmitting an information signal in a predetermined frequency bandwidth to said telemetry antenna,
means to variably control the operating frequency of said oscillator in response to a bias voltage signal;
(D) said generating means on each surface including a first plurality of electromagnetic radiant energy responsive means connected in series,
the output from said first plurality of radiant energy responsive means on all of said surfaces being connected to said telemetering means to provide a power output having a minimum variation for all aspects of said vehicle while tumbling in space,
said generating means on each surface also including a second plurality of electromagnetic radiant energy responsive means,
the output from said second plurality of electromagnetic radiant energy responsive means on all of said surfaces being connected for generating a bias voltage signal having a minimum variation for all aspects of said vehicle while tumbling in space, said bias voltage signal being connected to said telemetering means to variably control the operating frequency of said oscillator.

References Cited by the Examiner

UNITED STATES PATENTS

| | | | |
|---|---|---|---|
| 2,927,212 | 3/1960 | Shimukonis et al. | 250—83.3 |
| 2,937,281 | 5/1960 | Bosch | 250—83.3 |
| 2,938,122 | 5/1960 | Cole | 250—83.3 |
| 2,942,110 | 6/1960 | Lehovec | 250—83.6 |
| 2,967,940 | 1/1961 | Erb et al. | 250—83.3 |
| 2,999,926 | 9/1961 | Jenny | 250—6 |
| 3,008,666 | 11/1961 | Kuck | 343—101 |
| 3,048,350 | 8/1962 | Cutler | 244—1 |
| 3,048,351 | 8/1962 | Donoho | 241—1 |

OTHER REFERENCES

Design Considerations for Space Communications, by Bartow et al., IRE Transactions on Communications Systems, vol. Cs–7, No. 4, December 1959, pp. 232 to 240.

RALPH G. NILSON, *Primary Examiner.*

FREDERICK M. STRADER, *Examiner.*

J. W. LAWRENCE, *Assistant Examiner.*